United States Patent

Mutchler

[15] 3,639,240
[45] Feb. 1, 1972

[54] CORROSION INHIBITORS FOR OIL MEDIA

[72] Inventor: John Powell Mutchler, Wilmington, Del.

[73] Assignee: Atlas Chemical Industries, Inc., Wilmington, Del.

[22] Filed: Sept. 17, 1969

[21] Appl. No.: 858,887

[52] U.S. Cl. ............................252/52 R, 252/52 A, 252/396
[51] Int. Cl. ..............................................................C10m 1/22
[58] Field of Search.............................252/52, 52 A, 396

[56] References Cited

UNITED STATES PATENTS 2,921,027  1/1960  Brennan.............................252/396 X
3,048,577  8/1962  Gaertner.............................252/52 X Primary Examiner—Daniel E. Wyman
Assistant Examiner—W. Cannon
Attorney—Kenneth E. Mulford, Roger R. Horton and Ernest G. Almy

[57] ABSTRACT

A rust-inhibiting oil composition is disclosed comprised of a mineral oil and an alkali-acid stable rust inhibitor which is represented by the formula $$[R-Z-R_2-O]_y-R_3$$

where R is an alkyl, alkenyl, alkaryl or alkenaryl radical; Z is oxygen or a methylene radical; y is a number from 1 to 4, $R_2$ is

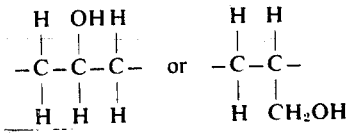

and $R_3$ is a radical which remains when y hydroxyl groups are removed from a polyhydric alcohol anhydride. The base polyhydric alcohol anhydrides for $R_3$ contains at least 1 hydroxyl group and at least 4 carbon atoms and the rust inhibitor contains at least one alkyl or alkenyl radical of at least 8 carbon atoms. The rust inhibitor is used at levels of from .09 to 10 weight percent based upon the oil.

6 Claims, No Drawings

CORROSION INHIBITORS FOR OIL MEDIA

This invention concerns improved oil compositions. More particularly, this invention concerns oil compositions which contain improved rust-inhibiting agents for ferrous containing metal surfaces.

The addition of various additives and agents to oils to enhance their properties and stop the loss of oil effectiveness is old in the art. These agents perform many functions some of which are: variation of oil viscosity, and prevention of oil oxidation, oil sediment buildup, corrosion, rust, and binding of moving parts, (see *Lubricant Additives* by C. V. Sinalheer et al., the Lubrizol Corporation, 1967, Library of Congress Catalogue Card No. 67–19868). In uses where the oil is in contact with iron or iron-containing surfaces it has been found that antirust agents or inhibitors are needed to prevent moisture attack of the metal surface. Among the known additives are the salts of fatty amines, fatty imidazoles, and fatty acids; the former have poor alkali stability and the latter have poor acid stability making the choice of additives dependent on the oil use. Thus an unexpected change in the pH of the system leads to undesirable rusting of the metal surfaces due to said instabilities. The rust inhibitors of this invention are stable in both acid and alkaline oils and in fact are not adversely effected by the presence of either strong acids or bases.

It is an object of this invention to provide stable oil compositions containing rust inhibitors.

It is another object of this invention to provide oil compositions containing rust inhibitors that are not affected by acid or alkaline conditions.

These objects and still further objects will become apparent to those skilled in the art from the following detailed description of the invention.

The oil compositions of this invention contain a mineral oil in combination with antioxidants, detergents and other additives mentioned above and an alkali-acid stable rust inhibitor. Said alkali-acid stable rust inhibitors can be represented by the formula:

(A)  $[R-Z-R_2-O]_y-R_3$ wherein
R is an alkyl, alkenyl, alkaryl or alkenaryl radical,
y is a number from 1 to 4,
Z is oxygen or a methylene radical,
$R_2$ is

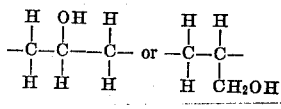

$R_3$ is a radical which remains when y hydroxyl groups are removed from a polyhydric alcohol anhydride.

Said polyhydric alcohol anhydrides contain at least four carbon atoms and at least one hydroxyl group and in said formula the radical comprised of $R-Z-R_2-$ contains a saturated or ethylenically unsaturated aliphatic hydrocarbon chain of at least eight carbon atoms.

A detailed description of preparing the above compounds and examples of the classes of radicals can be found in a copending application of A. H. Sherman and J. D. Zech entitled *FATTY ETHERS OF POLYHYDRIC ALCOHOLS* filed of even date with this application. Said application and having the Ser. No. 858,881 is hereby incorporated by reference and pertinent portions of same are as follows:

"This invention concerns novel ether compositions and a process for producing same. More particularly, this invention concerns ethers of lipophilic epoxides, and polyhydric alcohols and their anhydrides and a process for producing same.

"It is an object of this invention to provide novel ether compounds.

"It is another object of this invention to provide a process for the preparation of said ethers.

"It is also an object of this invention to provide new surfactant compositions which are acid and alkali stable.

"Still further objects will become apparent to those skilled in the art from the following detailed description of said invention.

"The novel ether compositions of this invention may be represented by the formula (1) $[R-X-R_2-O]_y-R_3$, and mixtures of same with compounds represented by formula (2) $[R-X-R_2-O]_y-R_1$, wherein R is an alkyl, alkenyl, alkaryl, or alkenaryl radical; X is either oxygen, sulfur or a methylene radical, $R_2$ is selected from a group of radicals represented by the formulas:

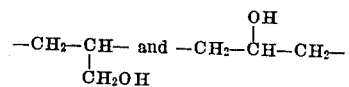

y is a number from 1 to 4, and $R_3$ is a radical remaining when y hydroxyl groups are removed from an anhydrized polyhydric alcohol, said anhydrized polyhydric alcohol containing at least one hydroxyl group and at least four carbon atoms, $R_1$ is a radical remaining when y hydroxyl groups are removed from a polyhydric alcohol which contains at least three hydroxyl groups and at least three carbon atoms, said mixtures contain at least 10 weight percent of compound within formula (1), and contain no more than 10 weight percent of three carbon atom alcohols.

"More particularly, the compounds of this invention, as represented by formula (1) above, will have an alkyl or alkenyl radical comprising a combination of R, X and $R_2$ which is at least about eight carbon atoms long. Thus where R is an alkaryl or alkenaryl radical the alkyl or alkenyl moiety of said radicals contain a saturated or ethylenically unsaturated aliphatic hydrocarbon chain of at least eight carbon atoms.

"Exemplary of the R radicals are the following: dodecyl, octyl, octenyl, nonylphenyl, nonenylphenyl, octadecyl, docosyl, docosenyl, octadecylphenyl, eicosyl, decyl, tetradecyl, octylphenyl, and docosenyl phenyl.

"In a preferred class of R radicals, the total alkyl or alkenyl chain would be from about 10 to about 25 carbon atoms such as dodecyl and octadecylphenyl.

"Said anhydrized polyhydric alcohols are anhydrized alkanetriols, alkanetetrols, alkanepentols, hexitols, and oxyalkylene substituted anhydrized polyhydric alcohols of the above classes, wherein the oxyalkylene content is from 1 to 30 mols per mol of said anhydrized polyhydric alcohol.

"Examples of the above anhydrized polyhydric alcohols include erythritan, threitan, xylitan, sorbitan, mannitan, iditan, isosorbide, 2,5-bis(hydroxymethyl) tetrahydrofuran, polyoxyethylene(10)dulcitan, polyoxyethylene(20)xylitan, polyoxypropylene(6)sorbitan, and polyoxyethylene(3)isosorbide.

"Said polyhydric alcohols are selected from alkanetetrols, alkanetriols, alkanepentols, hexitols, hexitans, pentitans, and mixtures thereof, and oxyalkylene substituted polyhydric alcohols of the above classes wherein the oxyalkylene content is from 1 to 30 mols per mol of said polyhydric alcohol.

"Examples of these polyhydric alcohols include: glycerine, 1,2,3-butanetriol, erythritol, xylitol, sorbitol, 1,2,5,6-hexanetetrol, threitol, 1,2,4-butanetriol, 1,2,5-pentanetriol, polyoxyethylene(2)mannitol, polyoxypropylene(10)xylitol.

"A preferred class of said polyhydric alcohols and said anhydrized polyhydric alcohols contains at most about 10 carbon atoms.

"The classes of compounds within formula (1) include 2-hydroxyalkyl ethers of said anhydrized polyhydric alcohols; 1-hydroxylmethyl alkyl ethers of said anhydrized polyhydric alcohols; 2-hydroxyalkenyl and 1-hydroxymethylalkenylethers of said anhydrized polyhydric alcohols; alkylphenyloxyhydroxypropyl and alkenylphenyloxyhydroxypropyl ethers of said anhydrized polyhydric alcohols; alkyloxyhydroxypropyl, alkenyloxyhydroxypropyl, and alkylthiohydroxypropyl, alkenylthiohydroxypropyl, alkylphenylthiohydroxypropyl and alkenylphenylthiohydroxypropyl ethers of said anhydrized polyhydric alcohols.

"Some specific examples of such compounds include: 2-hydroxydodecyl ether of 1,4-sorbitan; (1-hydroxymethyl)heptadecenyl ether of polyoxyethylene(10)xylitan; 2 hydroxy dodecyl ether of A-Polyol anhydride [A-Polyols are particular mixtures of polyhydric alcohols the preparation of which are described in examples A-E, infra,]; octyloxyhydroxypropyl ether of mannitan; decenyloxyhydroxypropyl ether of isosorbide; dodecyloxyhydroxypropyl ether of isomannide; docosyl phenyloxyhydroxypropyl ether of A-Polyol; octylthio(hydroxypropyl) ether of sorbitan, docosenylthio(hydroxypropyl) ether of polyoxyethyl(10)mannitan; nonylphenylthio(hydroxypropyl) ether of polyoxyethylene(25)isosorbide; di(dodecyloxyhydroxypropyl) ether of xylitan, tetra(nonylphenylthio[hydroxypropyl]) ether of sorbitan; and other compounds within the classes encompassed by formula (1).

"Classes of compounds within formula (2) above include those listed above for formula (1) wherein they are ethers of nonanhydrized polyhydric alcohols. Specific examples include 2-hydroxy nonyl ether of threitol, dodecylthiohydroxypropyl ether, and 2-hydroxydodecenyl ether of sucrose A-polyol.

"A preferred group of ether compositions within formulas (1) and (2) are ethers of A-Polyol and mixtures of compositions within formulas (1) and (2). Examples of the compounds within the above preferred class include β-hydroxydocosenyl ether of sucrose A-Polyol anhydride, nonylphenyl ether of cornstarch A-Polyol anhydride; decyloxyhydroxypropyl ether of xylose A-Polyol anhydride; nonylthiohydroxypropyl ether of sucrose A-Polyol anhydride; dodecyl ether of glucose A-Polyol, an 80-20 weight percent mixture of β-hydroxydodecyl ether of sorbitan and nonylthiohydroxypropyl ether of threitol, and a 90-10 weight percent mixture of nonylphenyl oxy(hydroxypropyl) ether of mannitol and γ-hydroxymethypentadecyl ether of sorbitan.

"The novel compounds of this invention may be made by reacting an epoxide, represented by the formula (3) R—X—R$_4$, with said polyhydric alcohol or said anhydrized polyhydric alcohol in the presence of a catalyst, and a solvent, at temperatures of about 60° to about 200° C., and in a mol ration of epoxide to alcohol from about 1 to 1 and up to about 4 to 1. In formula (3) above R and X are as defined in formula (1) and R$_4$ is an oxyranylmethyl radical. The epoxide contains an alkyl or alkenyl chain of at least eight carbon atoms. Illustrative of these epoxides are the following commercially available compounds—Nedox 1114— a mixture of terminal olefin oxides whose chain length varies from 11-14 carbon atoms, Nedox 1518—a mixture of terminal olefin oxides of carbon chain length of 15-18, stearylglycidylether, cetylglycidylether, laurylglycidylether, and nonylphenylglycidylether.

"The mechanism of this reaction is a normal epoxide addition reaction. Therefore, if an epoxide of formula (3) is reacted with a hexitol anhydride, one could write the reaction as:

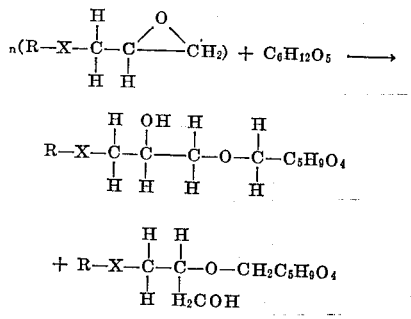

In the above formulas the reaction product illustrates the two products which may result when the epoxide ring opens; $n$ is the number of mols of epoxide per mol of alcohol.

"During the course of the reaction the temperature is not a critical variable. When the temperature is within the range enumerated above, 60° to about 200° C., the reaction will proceed; however, the greater the temperature the faster the reaction should proceed. At temperatures below 60° C. the reaction will proceed too slowly to be practical. When the temperature exceeds 200° C. there is a possibility of some product or reactant degradation. A preferred temperature is from about 80° to about 120° C.

"The catalysts which may be used in this reaction are the usual epoxide catalysts. These include both the acidic catalysts such as Lewis acids, and basic catalysts such as alkali metals, their hydroxides, and basic salts, amines, and alkali alkoxides. Examples of these catalysts are: boron trifluoride, boron trifluoride etherate or the phenol or acetic acid complex thereof, sulfuric acid, p-toluenesulfonic acid, perchloric acid, aluminum trichloride, ferric chloride, fluosulfonic acid; stannic chloride, sodium, lithium, calcium and their alkoxides, triethylamine, sodium acetate, and acid clays. The usual concentration of these catalyst is from 0.01 to about 5.0 weight percent of the reactants, depending upon the catalyst. A more preferred range of catalyst concentration is 0.10 to 1.0 weight percent. A preferred class of catalysts is BF$_3$ NaOH and LiOH.

"Naturally the temperatures and catalyst concentration are interdependent and the higher the catalyst concentration the more rapid the reaction at a given temperature or the higher the temperature the less catalyst is needed.

"To successfully run the subject reactions it has been found that a mutual solvent is almost always needed because of the incompatability of the hydrophilic polyhydric alcohols and the hydrophobic epoxide. In certain instances, however, where the hydrophilicity of the alcohol is not too great, such as with isosorbide, the epoxide will dissolve in same, and thus it acts as its own solvent. In this case, however, at least a 1 mol excess of polyol will be required to insure a homogeneous solution. Solvents which have been used include dioxane, diglyme, methyl ethyl ketone, pyridine and dimethyl formamide. Basic catalyst can be utilized in all of these solvents, however, the acid catalysts cannot be used where the solvent is an amine or a derivative of same, thus pyridine and dimethylformamide should only be used with basic catalysts. The preferred solvents for this reaction are dioxane and diglyme.

"A preferred mixture of polyhydric alcohols used in this reaction is a distillation fraction of a hydrogenolysis reaction product as described in U.S. Pat. No. 3,278,398. In said patent the preferred polyol mixture is a particular fraction labeled "-second-subfraction" on the schematic flowsheet, and it is also identified as the bottoms fraction of a distillation column called the Tetritol Column. This distillation fraction is generically called "A-Polyol" for the purposes of this disclosure. A-Polyol is an intimate mixture of polyols boiling at or around the boiling point of glycerine and at temperatures higher than glycerine. The A-Polyol will vary slightly in composition depending upon the starch or sugar or combination of same used in the hydrogenolysis process. Thus when inverted sucrose, a 50/50 mixture of fructose and glucose, undergoes hydrogenolysis and the product is fractionated by the above patents distillation scheme, the tetritol columns bottoms stream will contain polyols ranging from glycerine up through the various isomers of hexitol and include some recombination products of the monosacharrides present in the feed. This product is A-Polyol of hydrogenolytic invert sugar. In all A-Polyols the quantity of glycerin is maintained at levels below 10 weight percent of the A-Polyol composition and in most instances the glycerin content will not be more than 2 weight percent.

"To illustrate the preparation of A-Polyols, the following examples are presented:

EXAMPLE A

"A 60 weight percent water solution of invert sugar, in the presence of 2.0 weight percent of a supported nickel catalyst and 1.0 weight percent of calcium carbonate is heated in an autoclave at 2000 p.s.i.a. and 220° C. and reacted with hydrogen for 2 hours.

"The catalyst and other insoluble salts are filtered from the reaction product and the filtrate is distilled to remove essentially all water at temperatures of up to 230° C. and at pressures slightly higher than atmospheric. The distillation column bottom stream is then further fractionated in a second column at a still temperature of 230° C., with the top of the column maintained at 100 mm. of Hg absolute. All columns used in this example are bubble tray distillation columns.

"The bottoms product of the second column contains polyols which boil at temperature around or higher than the boiling point of glycerin. This second column bottoms is introduced as feed in a third column (The Tetritol Column heretofore mentioned) which is maintained at a top pressure of 100 mm. Hg absolute while the bottom temperature is maintained at 230° C. The reflux rate and vapor rate are maintained so that the bottom stream of said tetritol column contain at most 2 percent glycerin.

"This bottom stream is within the category of polyols called A-Polyols for purposes of this disclosure.

EXAMPLE B

"A polyol within the class of A-Polyols is prepared by fractional distillation per example A of a hydrogenolytic product of corn starch hydrolyzate.

EXAMPLE C

"A polyol within the class of A-Polyols is prepared per example A by fractional distillation of a hydrogenolytic product of wood sugar.

"A preferred mixture of polyhydric alcohol anhydrides is an anhydrized A-polyol. That is an A-polyol as defined above is anhydrized under either acid or basic conditions until up to about 2 mols of water are removed per mol of A-polyol. The anhydrization of said A-polyol may be performed using an acid or alkali catalyst such as mineral acido and their acid salts, and alkali metal earths, their hydroxides, oxides and basic salts. Examples of such catalysts are $H_2SO_4$, $H_3PO_4$, HCl, NaOH, $Ca(OH)_2$, KOH, $NaOOC_3H_5$ and LiOH. This anhydrization is made notwithstanding the fact that all A-polyols contain anhydrized polyhydric alcohols.

"To illustrate the preparation of these anhydrized A-polyols, the following nonlimiting examples are present:

EXAMPLE D

"Two hundred grams of the A-polyol prepared according to example A are heated to 100° C. and stirred to create a homogeneous mass. To said A-polyol is added 3 ml. of 50 percent (weight volume) aqueous sodium hydroxide. This mixture is then heated to 225° C. at which point water and the volatiles are given off. The heating of said mixture is continued until 260° C. at which point 6 weight percent of the original mixture has been volatilized of which 92 percent is water or about 0.5 mols of water per mol of polyol. This anhydrized product is then cooled to room temperature.

EXAMPLE E

"Per example D the A-polyol prepared in example B is heated to 100° C. and 6 ml. of 50 weight percent sulfuric acid is added. The mixture is heated to 160° C. and maintained at this temperature until 20 weight percent volatiles of which 90 percent is water, is flashed. The water equals about 1.6 mols of water removed per mol of A-Polyol.

"Since many of the epoxides used in producing the ethers of this invention are not particularly common, the following representative examples are given to illustrate their preparation.

EXAMPLE F

"Two hundred forty-two grams (1 mol) of hexadecyl alcohol is heated to about 70° C. and 2 ml. of an ether solution of $BF_3$ (45 weight percent $BF_3$) is added. To this one adds dropwise 93 grams (1 mol) of epichlorohydrin while maintaining the temperature at 70° to 90° C. This mixture is stirred for an additional hour within the 80° to 90° C. temperature span and then diluted with 500 ml. of dioxane and 164 grams of sodium aluminate. This mixture is refluxed for about 8 hours and then filtered. The filtrate is a dioxane solution of hexadecyl glycidyl ether.

EXAMPLE G

"Per the procedure of example F, 202 grams of tridecyl alcohol, in the presence of 2 ml. of 45 weight percent ether solution of $BF_3$, is mixed with epichlorohydrin and then heated at 80°–90 C. for 1 hour. This mixture is then diluted with 50 ml. of dioxane and 164 grams of sodium aluminate. This solution is reacted for about 8 hours at its reflux temperature. The product is a tridecyl glycidyl ether.

EXAMPLE H

"A mixture of 202 grams of 1-dodecanethiol and 102 grams of epichlorohydrin is heated to about 80° C. To this, over a period of 1 hour and while maintaining the temperature at about 90°–110° C., is added 40 grams of powdered sodium hydroxide. This mixture is then vacuum stripped to remove any volatiles formed. This mixture is then cooled and dissolved in 500 ml. of benzene and filtered to remove any salts present. The benzene is then stripped to leave the dodecyl glycidyl thioether.

EXAMPLE I

"A solution of 268 grams of oleyl alcohol in 50 ml. of dioxane is heated to about 70° C. Two ml. of a 45 weight percent $BF_3$ ether solution are added to the oleyl and then while maintaining the oleyl solution at 70°–90° C. Ninety-three grams of epichlorohydrin are added. After the addition is completed the mixture is stirred at 80°–90° C. for an hour. Then 164 grams of sodium aluminate is added in portions and the mixture stirred at 80°–90° C. for an additional 8 hours. Upon filtering the solids from the mixture the filtrate is a solution of oleyl glycidyl ether in dioxane.

EXAMPLE J

"Per the procedure of example H, 146 grams of 1-octanethiol is reacted with 102 grams of epichlorohydrin. The resultant product is octyl glycidyl thioether.

"To better illustrate the process of this invention and to enable those skilled in the art to practice the subject invention the following nonlimiting examples of the preparation of the ethers of said invention are presented.

EXAMPLE 1

"To a solution of 10 grams of sucrose, A-Polyol anhydride of example E and 4 ml. of boron trifluoride etherate in 200 ml. of dioxane is added 1 mol of the hexadecyl glycidyl ether as a dioxane solution prepared in example F while maintaining the temperature at 95°–100° C. After the addition is completed the mixture is refluxed for 2 hours. The product is vacuum stripped to remove the dioxane solvent and yields a hexadecyloxy-hydroxypropyl ether of sucrose A-Polyol anhydride.

EXAMPLE 2

"Per the procedure of example 1, 100 grams of the A-Polyol anhydride prepared in example E are reacted with 1 mol of oleyl glycidyl ether in a dioxane solvent to yield the oleyl-oxyhydroxypropyl ether of said anhydrized A-Polyol.

EXAMPLE 3

Per the procedure of example 1, 100 grams of the A-Polyol anhydride prepared in example E is reacted with 1 mol of dodecyl glycidyl thioether to yield the dodecylthiohydroxypropyl ether of said A-Polyol anhydride.

EXAMPLE 4

"One hundred sixty-four grams of sorbitan and 3.4 liters of dimethyl sulfoxide are heated to 110° C. and stirred under nitrogen. To this 3 grams of powdered potassium hydroxide is added and 367 grams of Nedox 1518 olefin oxide is gradually added. The mixture is stirred and heated at 110° to 120° C. for 16 hours. The product is then vacuum stripped of chemical solvents and volatiles.

EXAMPLE 5

"One hundred sixty-four grams of mannitan and 1,500 milliliters of dimethyl formamide are stirred and heated to 120° C. Then 2 grams of sodium hydroxide are added and 245 grams of Nedox 1518 olefin oxide is gradually added to the above. The mixture is then heated to 140° C. and maintained at this temperature until the epoxide number (grams of product equivalent to 1 mol of free epoxide) is above 30,000. The mixture is then vacuum distilled to remove the solvent.

EXAMPLE 6

"One hundred sixty-four grams of 2,5-bis hydroxymethytetrahydrofuran is stirred with 1,000 milliliters of pyridine and the mixture is heated to reflux under a nitrogen blanket. To this is added 189 grams of Nedox 1114 olefin oxide dropwise and refluxing is continued until the epoxide number is above 30,000. The product is vacuum distilled to remove the solvent.

EXAMPLE 7

"One hundred grams of anhydrized A-Polyol of example D with a hydroxyl number of 1,053 is dissolved in 100 milliliters of dioxane. The solution is heated to 95° C. and 2 milliliters of boron trifluoride etherate is added as catalyst. Then 132 grams of Nedox 1114 is added dropwise over an hour period while the temperature is maintained at 95° to 110° C. After the addition is completed, the reaction mixture is stirred at 108° to 110° C. for an additional 2 hours. The product is stripped of solvent to leave a residue of 229 grams of a homogeneous red brown liquid. The hydroxyl number is 410. Partition of the product between ethyl acetate and aqueous sodium sulfate shows only 15.8 percent free polyol present.

EXAMPLE 8

"Per the procedure of example 7, 170 grams of Nedox 1518 are reacted with 100 grams of A-Polyol anhydride of example D. The product is 273 grams of a homogeneous waxy solid whose hydroxyl number is 380. Its epoxide equivalent is infinity. Partition of this product shows only 13.6 percent free polyol present.

EXAMPLE 9

"Per the procedure of example 7, 191 grams of stearyl glycidyl ether is reacted with 100 grams of A-Polyol anhydride of example E. The product is a homogeneous waxy solid, whose hydroxyl number is 325 and whose epoxide equivalent is infinity. Partition of the product shows only 10 percent free polyol present.

EXAMPLE 10

"Six hundred sixty-two grams of polyoxyethylene(10)sorbitan are reacted per example 6 with 367 grams Nedox 1518 olefin oxide. The product is then vacuum stripped to remove solvents and volatiles.

EXAMPLE 11

"1,246 grams of polyoxypropylene(20)mannitan are reacted per the procedure of example 5 with 1 mol of dodecylphenyl glycidyl ether over a 5-hour period at a temperature of approximately 160° C. The resultant product is vacuum distilled to remove the solvent.

EXAMPLE 12

"One hundred seventy grams of Nedox 1518 are reacted, in accordance with example 7, with 100 grams of A-Polyol of example B. The resultant Nedox 1518 ether of A-Polyol cornstarch hydrolyzate is then mixed with 130 grams of the ether product of example 10 resulting in a final composition containing 43.5 weight percent of Nedox 1518 ether of polyoxyethylene(10)sorbitan and 56.5 weight percent of Nedox 1518 ether of A-Polyol of cornstarch hydrolyzate.

EXAMPLE 13

"Two hundred grams of tridecyl glycidyl ether are reacted with a 20-80 weight percent mixture of erythritol and sorbitan respectively according to the procedure of example 7. The product is a mixture of tridecyl oxy($\beta$-hydroxypropyl) ether of sorbitan tridecyl oxy($\beta$-hydroxypropyl) ether of erythritol, tridecyl oxy($\alpha$-hydroxymethyl ethyl) ether of sorbitan and tridecyl oxy($\alpha$-hydroxymethyl ethyl) ether of erythritol.

"The epoxide-alcohol ethers of this invention have been found to be excellent surfactant compositions. In particular they have been shown to be more resistant to acid and alkali solutions than organic ester type surfactants heretofore used. They can be used an antifoaming agents, emulsifiers and dispersants, the exact utility being dependent upon the relation of the hydrophobic and hydrophilic groups present in the final product. Thus said ethers can be used instead of and replace the heretofore-used ester products such as sorbitan stearate acid ester, polyoxyethylene(10)sorbitan trioleate acid ester, and polyoxyethylene(20)sorbitol oleate acid ester."

These inhibitors can be used in their crude form such as those prepared in the example given above from the copending application or they can be purified. That is, the unreacted polyol may be removed by solvent extraction. One usual dual solvent system used for this extraction is ethyl acetate and a sodium sulfate water solution. The reaction product is mixed in this two-phase system and the unreacted polyol dissolves in the aqueous phase whereas the rust inhibitor dissolves in the organic phase. Decanting this mixture and evaporation of the ethyl acetate will leave the purified rust inhibitor. Thus in table I two ethers of Nedox 1518 are used at different purity levels, and both show equal rust-inhibiting properties.

The oil component of this composition can be any mineral oil compatible with carrying out lubricating functions in the various locations where metal to metal contact occurs in the art. The viscosity ranges of the oil, of the above composition, may vary anywhere from about 50 saybolt Universal Seconds (SUS) to greater than 2,000 SUS at 100° F. The normal range of oils would have a viscosity from about 80 SUS at 100° F. to about 500 SUS at 100° F. The specific viscosity would naturally depend upon the service for which the composition is designed. Therefore where a high-temperature diesel engine is to be lubricated an oil with a greater viscosity would generally be used, on the other hand where the lubrication is used at low temperatures, such as in a rear axle transmission, lower viscosities are used.

Some particular oils which are used in these compositions are an SAE mineral oil wherein the viscosity range will vary from 58 to 70 SUS at 210° F. and have a Society of Automotive Engineer Scale Viscosity of about 30 SAE. A typical SAE 30 oil has the following properties. American Petroleum Institute Specific Gravity at 60° F. of approximately 24.5, a pour point of minus 5° F. maximum, a Cleveland open cup flashpoint of 415° F. minimum. A viscosity range at 210° F. of 58 to 63 SUS and a viscosity index of 50 to 60. A typical SAE 20 oil, such as Sunvis 11, has the following properties, a viscosity at 100° F. of 100–120 SUS, an API gravity at 60° F. of 31–33, a Cleveland open cup flashpoint of 370° F. minimum, a fire point of 420° F. minimum, a pour point of 0° F. maximum, and a density of about 7.206 pounds per gallon.

Although the oil and rust inhibitor are the two major components of the composition other additives may be added depending upon the use and the extent of protection to the metal surfaces that the compounder desires. As indicated above the other types of additives may be used in the composition, examples of these additives are: detergents, antioxidants, viscosity index adjusters, corrosion inhibitors, antiwear agents, dispersants, and antifoaming agents. Examples of these types of additives are as follows:

1. antifoam agents which include silicones and various organic copolymers;
2. antistain additives which are mainly used in gear oils and include polyoxyaluminum acylates and dibenzothiazoles;
3. antichatter additives which are used to limit the noise in limited slip differentials for motor vehicles and include amide-metal dithiophosphate combinations, amine salts of azomethine combinations and amine dithiophosphates;
4. antinoise additives which are called antisquawk additives for automatic transmission fluids in motor vehicles and include n-acylsarcosines and derivatives thereof, sulfurized fatty acids and esters, organophosphorus acid, fatty acid combinations and esters of dimerized fatty acids;
5. antifouling agents such as chlorinated hydrocarbons which are used extensively in two-stroke engines to avoid the buildup of deposits.

Some of the more common oil additives used in oils include: detergents such as:

a. sulfonates the normal and basic salts of petroleum sulfonic and long-chain alkyl-substituted benzene sulfonic acids, phosphonates and/or thiophosphonates;
b. phenates: the normal and basic metal salts of alkyl phenols, alkyl phenol sulfides and alkyl phenol aldehyde condensation products; and
c. alkyl-substituted salicylates, the normal and basic salts of long-chain alkyl substituted salicylic acid.

Corrosion inhibitors, those additives which protect nonferrous metal parts from attack by oxidation products in the oil. The major classes of these compounds are:

a. metal dithiophosphates especially zinc diorganothiophosphates, which can be represented by the formula

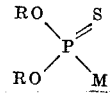

wherein R is an organic radical, M is equivalent to a metal such as zinc, barium or nickel;

b. metal dithiocarbamates especially zinc dithiocarbamate. These compounds may be described by the general formula

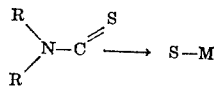

where R and M are defined above. The final two classes of corrosion inhibitors include:

c. sulfurized turpene such as sulfurized dipentene; and
d. phosphorus sulfurized turpenes such as phosphorus pentasulfide treated turpene.

Anti-oxidants, used to prevent the degradation of the oil at high temperatures and include:

a. blocked phenols such as 2,6-tertiary-butyl-4-methylphenol; 4,4'-methylene bis(2,6-ditertiary butylphenol), and 4,4'-thio bis (2-methyl-6-tertiary butylphenol); and
b. amines such as N-phenyl β-naphthamine, tetramethyldiamino-diphenylmethan, onthranilic acid, phenothiazine and its alkylated derivatives.

Other additives include viscosity adjuncts such as viscosity index improvers and pour point depressors and extreme pressure additives which aid the oil in preventing destructive metal to metal contact.

The level of these various components in the oil will depend upon the resultant properties desired. Particularly, the rust inhibitors of this invention may be present in quantities from about 0.09 to as high as 10 weight percent based upon the weight of oil. The lower limit denotes the level below which the antirust effect of the compound loses effectiveness. The upper limit is merely illustrative of the large amounts of inhibitors which are compatible with the oil. However, 10 percent is an excessive amount from an economic standpoint. A preferred range of addition of these rust inhibitors is from about 0.15 to about 5 weight percent of the composition based on the oil.

To illustrate the effectiveness of the above corrosion inhibitors, various compounds within formula (A) above are prepared, are dissolved in Sunvis 11, and are tested for a corrosion- and rust-inhibiting tendencies per the following procedure.

Two percent of the rust inhibitor is, by gently stirring, dissolved in an oil. A polished metal sample is then dipped in the oil containing the rust inhibitor and held over live steam for varying lengths of time. The polished metal surfaces are intermitently checked for rust.

Table I below gives the test results for three additives of this invention prepared and tested by the above procedure and labeled examples 1a, 2a and 3a. Table I also presents data for a strip of polished metal where the oil contained no inhibitor and is thus outside the invention, this data is in the final column and is not a numbered example.

TABLE I.—RUST DATA—2% RUST INHIBITOR IN SUNVIS 11 OIL

| | Rust inhibitor | | | |
| --- | --- | --- | --- | --- |
| | 1a | 2a | 3a | |
| Example | Nedox 1518 [1] | Nedox 1518 [2] | Stearyl glycerol [3] | None |
| Time exposed to steam: | | | | |
| 20 minutes | No rust | No rust | No rust | Heavy rust. |
| 2 hours | do | do | do | Do. |
| 3 hours | Slight rust | Slight rust | Slight rust | Do. |
| 4 hours | do | do | do | Do. |

[1] Ether of anhydrized sucrose A-Polyol (30.5% polyol extracted).
[2] Ether of anhydrized sucrose A-Polyol (13.6% polyol extracted).
[3] Ether of anhydrized sucrose A-Polyol (10.0% polyol extracted).

Additional examples of compositions of this invention are as follows, all of these examples are prepared by mixing the rust inhibitor into the oil until it dissolves and then the other additives. However, the order of addition of the components is not critical.

EXAMPLE 4a

| Component | Grams |
| --- | --- |
| Mineral oil (viscosity of 20 to 40 SUS at 210° F.) | 100 |
| β-hydroxy octadecyl ether of polyoxyethylene(5) sorbitan | 5 |

EXAMPLE 5a

| Component | Grams |
| --- | --- |
| Paraffin oil (SUS viscosity 80–100 at 100° F.) | 100 |
| Docosyloxy(2-hydroxypropyl) ether of mannitan | 1.4 |

EXAMPLE 6a

| Component | Grams |
|---|---|
| Mineral oil (viscosity of 500 to 510 SUS at 210° F.) | 100 |
| Nonylphenyloxy(α-hydroxymethyl-ethyl) ether of polyoxyethylene(20)erythritan | 4.0 |

EXAMPLE 7a

| Component | Grams |
|---|---|
| Sunvis 11 | 100 |
| Dodecylphenyloxy(2-hydroxypropyl) ether of anhydrized sucrose A-polyol | 1.5 |

EXAMPLE 8a

| Component | Grams |
|---|---|
| Sunvis 11 | 10,000 |
| β-hydroxydocosenyl ether of erythritan | 100 |
| Detergent (calcium isooctylsalicylate) | 50 |
| 2,6-ditertiary-butyl-1,4-dimethyl phenol | 75 |

EXAMPLE 9a

| Component | Grams |
|---|---|
| Oil (SAE-50) | 5,000 |
| Stearyl oxy(hydroxypropyl) ether of polyoxyethylene(10) sorbitan | 50 |

EXAMPLE 10a

| Component | Grams |
|---|---|
| Oil (SAE 75) | 100 |
| di(dodecyloxyhydroxypropyl) ether of xylitan | 0.5 |

EXAMPLE 11a

| | |
|---|---|
| Oil (SAE 100) | 1,000 |
| Tetra[nonylphenyloxy(hydroxypropyl)] ether of polyoxypropylene(5)sorbitan | 18 |
| N-phenyl-alpha-naphthylamine | 9 |
| phosphorus pentasulfide terpentine | 7 |

Having thus described my invention I claim:

1. An oil composition comprising a mineral lubricating oil in lubricating amounts and a rust inhibitor for ferrous containing metal surfaces which is represented by the formula:

$$[R-Z-R_2-O]_y-R_3$$

wherein $y$ is a number from 1–4, R is an alkyl, alkenyl, alkaryl or alkenaryl radical, Z is an oxygen atom or a methylene radical, $R_2$ is

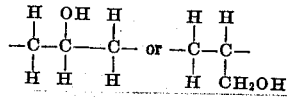

and $R_3$ is a radical remaining after $y$ hydroxyl groups are removed from a polyhydric alcohol anhydride where the polyhydric alcohol anhydride has at least four carbon atoms and at least one hydroxyl group, and the radical comprised of $R-Z-R_2-$ contains a saturated or ethylenically unsaturated aliphatic hydrocarbon chain of at least eight carbon atoms.

2. An oil composition according to claim 1 wherein said $R_3$ radical is a radical remaining after from one to four hydroxyl groups are removed from a polyhydric alcohol anhydride selected from the group consisting of anhydrides of hexitol, pentitols, alkane tetrols, alkane pentols and polyoxyalkylene derivatives of these wherein the polyoxyalkylene chain is from one to 30 polyoxyalkylene units long.

3. An oil composition according to claim 1 wherein the alkyl or alkenyl moiety of the rust inhibitor represented the radical comprised of $R-Z-R_2-$ is from 10 to 25 carbon atoms long.

4. An oil composition according to claim 1 wherein said rust inhibitor is a mixture of fatty ethers and said $R_3$ radical of the formula of claim 1 is derived from an anhydrized polyol mixture of a distillation fraction of a hydrogenolytic product of sugar, starch or mixture of same wherein said distillation fraction is comprised of polyhydric alcohols which boil at or above the boiling point of glycerine, wherein up to 2 mols of water per mol of polyhydric alcohol has been removed.

5. An oil composition according to claim 4 wherein the alkyl or alkenyl moiety of the rust inhibitor contains from 10 to 25 carbon atoms.

6. An oil composition according to claim 2 wherein said radical comprised of $R-Z-R_2-$ contains a saturated or ethylenically unsaturated aliphatic hydrocarbon chain of 10 to 25 carbon atoms.

* * * * *